United States Patent [19]

Ko et al.

[11] Patent Number: 4,820,971

[45] Date of Patent: Apr. 11, 1989

[54] PRECISION IMPEDANCE VARIATION MEASUREMENT CIRCUIT

[76] Inventors: Wen-Hsiung Ko, 1356 Forest Hills Blvd., Cleveland Hts., Ohio 44118; Gong-Jong Yeh, 2033 Cornell Rd., Cleveland, Ohio 44106

[21] Appl. No.: 868,781

[22] Filed: May 29, 1986

[51] Int. Cl.$^4$ .............................................. G01H 11/00
[52] U.S. Cl. ............................... 324/61 R; 324/60 CD
[58] Field of Search ........................ 324/61 R, 60 CD; 73/1 B, 1 D, 1 E, 4 R, 1 R

[56] References Cited

U.S. PATENT DOCUMENTS

| | | | |
|---|---|---|---|
| 3,581,196 | 5/1971 | Spaid | 324/60 |
| 3,585,496 | 6/1971 | Ichijo et al. | 324/60 |
| 3,621,385 | 11/1971 | Ichijo et al. | 324/60 |
| 3,943,439 | 3/1976 | Raymond | 324/60 |
| 4,071,822 | 1/1978 | Kamiya | 324/111 |
| 4,093,915 | 6/1978 | Briefer | 324/60 |
| 4,176,555 | 12/1979 | Dorman | 324/61 R |
| 4,190,797 | 2/1980 | Lecklider | 324/61 |
| 4,243,933 | 1/1981 | Rollman | 324/60 |
| 4,310,794 | 1/1982 | Maier | 324/61 |
| 4,719,409 | 1/1988 | Dorman | 324/60 CD |

*Primary Examiner*—A. D. Pellinen
*Assistant Examiner*—Leon K. Fuller
*Attorney, Agent, or Firm*—Fay, Sharpe, Beall, Fagan, Minnich & McKee

[57] ABSTRACT

A condition sensing capacitor (10) is placed in an appropriate position such that its capacitance Cx varies in accordance with a condition to be sensed. A reference capacitor (12) and a feedback capacitor (14) are positioned in locations in which their capacitances Co and Cf are unaffected by the sensed condition. During a first time period, the sensing capacitor is connected with a source (22) of a first calibration voltage source Vg, the reference capacitor is connected with a source (26) of a second calibration voltage Vo and the feedback capacitor is connected with the output (34). During a second time period, the charge stored on the sensing capacitor is reduced by a current mirror (60) in proportion to the charge stored on the reference capacitor. The charge on the feedback capacitor is reduced by a current mirror (62) in accordance with charge stored in stray capacitance. During a third time period, the charge stored on the sensing and feedback capacitors is substractively combined (30) to produce a difference current which is applied across a current-to-voltage converter (32). The converter transforms the difference current into an output voltage. In this manner, the output voltage Vout varies with the difference between the product of the first calibration voltage and the condition sensing capacitance and the product of the second calibration voltage and the reference capacitance, i.e. $Vout=(Vg\cdot Cx - Vo\cdot Co)/Cf$. The sensitivity S varies with the ratio of the first calibration voltage to the feedback capacitance, i.e. $S=Vg/Cf$. In this manner, the sensitivity can be adjusted by adjusting the first calibration voltage Vg and the output voltage can be nulled by adjusting the second calibration voltage Vo.

19 Claims, 4 Drawing Sheets

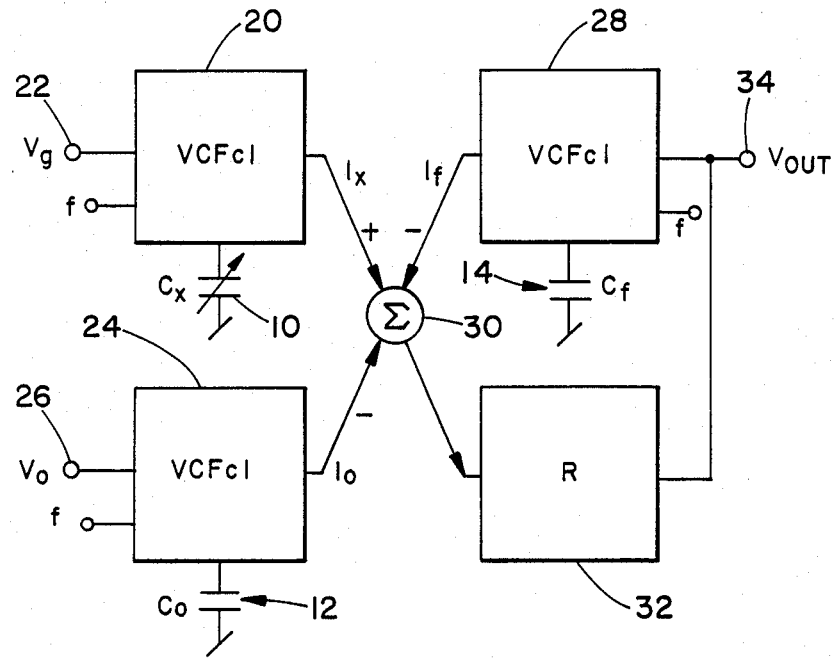
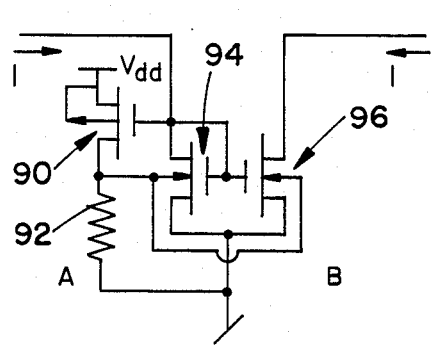
FIG. 3
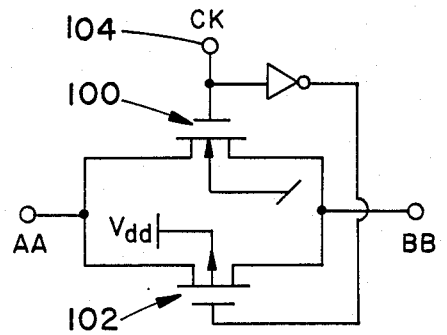
FIG. 4

PRECISION IMPEDANCE VARIATION MEASUREMENT CIRCUIT

BACKGROUND OF THE INVENTION

The present invention relates to the art of impedance discrimination for accurately measuring small impedance differences and variations. The invention finds particular application in measuring capacitance variations such as may be caused by changes in pressure. It is to be appreciated, however, that the invention may also be applicable to measuring other impedance variations and other physical phenomenon which cause such impedance variations including temperature, force, flow, acceleration, position, chemical concentration, and the like.

Heretofore, capacitive sensors have been incorporated in transducers for measuring the above listed and other physical phenomenon. An interface circuit monitors variations in the capacitance and produces an output signal which varies in accordance therewith. In one conventional interface circuit configuration, the capacitive element controls the frequency of an oscillator. The output frequency then changes in proportion to the changes in capacitance, hence, the sensed physical condition. However, variable frequency interface circuits commonly provide relatively poor baseline stability. Changes in the frequency are also attributable to time, temperature, and other events in addition to the sensed physical condition. Moreover, the accuracy and speed with which the capacitance changes can be measured are limited by the accuracy and speed which changes in the frequency can be resolved.

Another commonly used interface circuit includes a ratio detector such as a diode bridge to detect the change in capacitance relative to a null point. One of the drawbacks of the ratio detector is that its sensitivity is relatively poor. Small variations in capacitance are difficult to differentiate particularly where stray capacitances may be large relative to the capacitance of the sensor. This is a common problem with silicon-to-silicon capacitance sensors. Furthermore, because variations in the stray capacitance vary the null point of an individual transducer chip, on-chip trimming is required.

In a conventional calibration procedure, the sensitivity and the null point of the transducer are commonly adjusted. Both the variable frequency and the ratio detector interface circuits have interdependent sensitivity and null point adjustments. That is, adjusting one of the sensitivity and null point also alters the other. This renders calibration to a preselected operating point difficult and, in some instances, impossible. Further, this interdependent adjustment inhibits the incorporation of micro-controller or other automatic calibration systems.

The present invention contemplates a new and improved impedance measurement circuit which overcomes the above referenced problems and others.

SUMMARY OF THE INVENTION

In accordance with one aspect of the present invention, there is provided an impedance discrimination circuit for measuring a sensed condition which is related to impedance variation. A variable, sensing impedance means is provided whose current value impedance varies in accordance with the sensed condition. A first current source produces a sensed condition current which is proportional to the product of the current value of the variable impedance and a first calibration voltage level. A second current source produces a second or reference output current which is proportional to the product of a second calibration voltage and a reference impedance, which reference impedance does not vary with the sensed condition. A feedback current source generates a feedback current which is proportional to the product of an output voltage and a feedback impedance which does not vary with the sensed condition. A current-to-voltage converter converts the difference between the sensed condition current and the reference and feedback currents to the output voltage In accordance with another aspect of the present invention, a method is provided for measuring a sensed impedance variation. A first electrical source is connected with the condition sensing impedance and second electrical source is connected with a known, reference impedance for a preselected duration. In this manner, the reference impedance accumulates a known, reference amount of electrical energy and the condition sensing impedance accumulates an amount which is a function of the sensed condition. The reference amount of electrical energy is drained from the conditioned sensing impedance. The remaining electrical energy is drawn off and subtractively combined with a feedback electrical signal to generate a difference signal. The difference signal is converted into an output signal which is intermittently applied to a known feedback impedance. Stored energy is drawn from the feedback impedance to create the feedback signal.

One advantage of the present invention is that the sensitivity and null point can be programmed and adjusted independently.

Another advantage of the present invention is that it is sensitive to large stray capacitances, yet has a high output signal level.

Yet another advantage of the present invention is that it is amenable to the use of zero suppression techniques for the measurement of large capacitance variations.

Yet another advantage of the present invention is that it is amenable to the use of lock-in techniques to achieve higher resolution.

Still another advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The figures are only for purposes of illustrating a preferred embodiment and are not to be construed as limiting the invention.

FIG. 1 is a diagrammatic illustration of a measurement circuit in accordance with the present invention;

FIG. 3 is a schematic diagram illustrating the current mirror circuits of FIG. 2;

FIG. 4 illustrates an appropriate circuit for the switching means of FIG. 2;

DETAILED DESCRIPTION OF THE PREFERRED EMBODIMENTS

Figure 2:
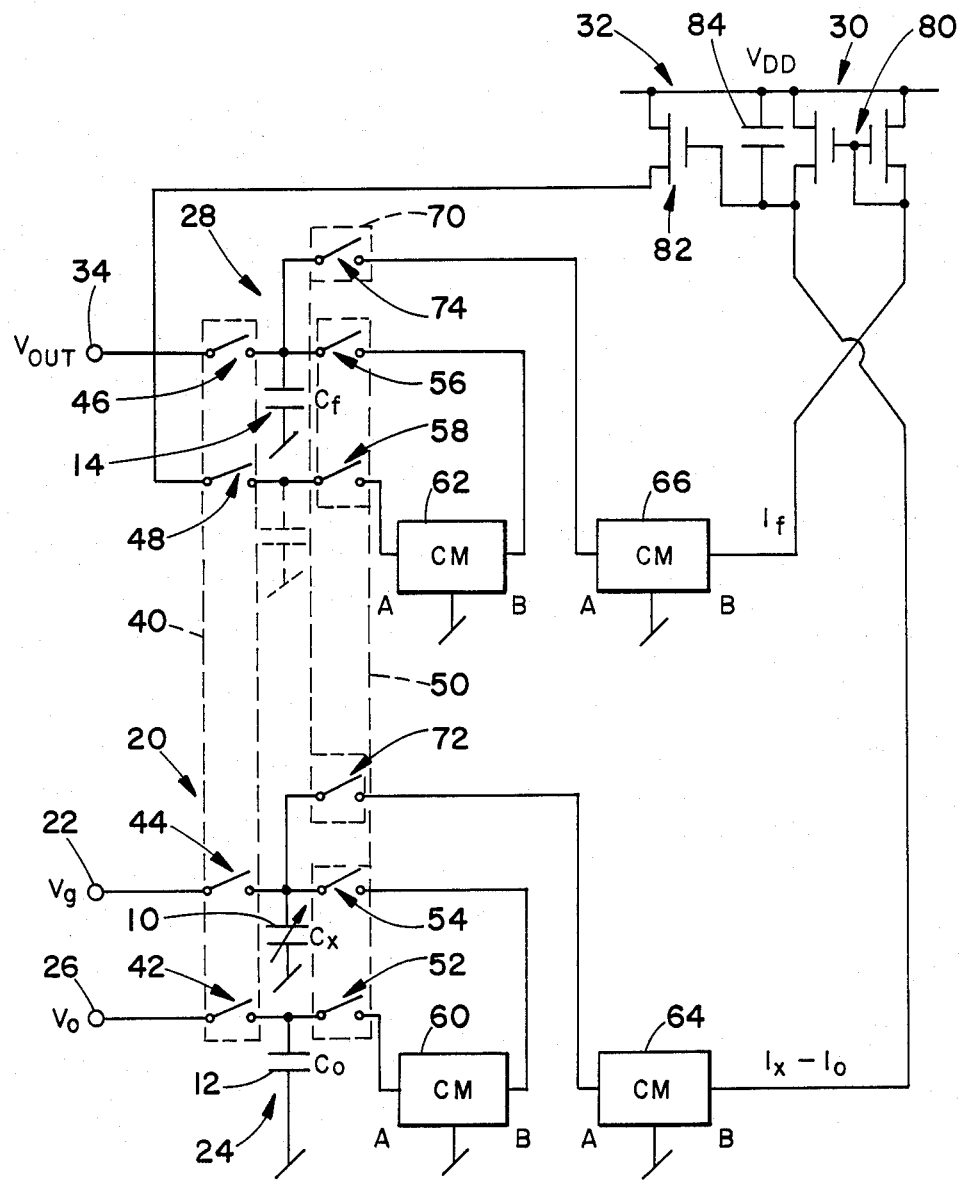
FIG. 2 is a more detailed illustration of the measurement circuitry.

With reference to FIGS. 1 and 2, a condition sensing impedance 10, such as a capacitor Cx whose capacitance varies with a sensed condition, is positioned to monitor the selected condition. A reference impedance 12, such as a reference capacitor Co, is positioned in a location which is unaffected by the sensed condition. A feedback impedance 14, such as a capacitance Cf, is also positioned where it is unaffected by the sensed condition.

A first or sensed condition voltage, capacitance, and frequency controlled current source 20 generates a first or sensed condition current Ix. The sensed condition current is proportional to the product of a first calibration voltage Vg from a first calibration voltage source 22 and the capacitance of the condition sensing capacitor Cx. A second or reference voltage, capacitance, and frequency controlled current source 24 produces a second or reference current which is proportional to the product of a second calibration voltage Vo from second calibration voltage source 26, and the capacitance of the reference capacitor Co. A third or feedback voltage, capacitance, and frequency controlled current source 28 generates a feedback current which is proportional to the product of an output voltage Vout and the capacitance of the feedback capacitor Cf.

A summing means 30 subtractively combines the feedback current and the reference current with the sensed condition current to generate a difference current, Ix-Io-If. A current-to-voltage converter 32 converts the difference current to the output voltage which is supplied to an output 34.

Stated mathematically, the output voltage is the product of the difference current and the impedance of the current to voltage converter, i.e.:

$$Vout = (Ix - Io - If) \cdot f \cdot R \quad (1a)$$
$$= (Vg \cdot Cx - Vo \cdot Co - Vout \cdot Cf) \cdot f \cdot R. \quad (1b)$$

Solving for the output voltage, $$Vout = \frac{(Vg \cdot Cx - Vo \cdot Co) \cdot f \cdot R}{(1 + Cf \cdot f \cdot R)} \quad (2)$$

When Cf fR is much greater than 1, the output voltage reduces to:

$$Vout = (Vg \cdot Cx - Vo \cdot Co)/Cf. \quad (3).$$

When Cf·f·R is much greater than 1, the output voltage is independent of the clock frequency f and to the magnitude of the impedance R of the current to voltage converter 32.

The sensitivity, S, is the amount of change in the output voltage caused by a given change in the capacitance of the condition sensing impedance 10, i.e.:

$$S = \partial Vout/\partial Cx = Vg/Cf \quad (4).$$

Thus, the sensitivity S varies in proportion to the magnitude of the first calibration voltage Vg. In this manner, the sensitivity can be adjusted by varying the first calibration voltage Vg. Thereafter, the output voltage can be nulled by varying the second or reference calibration voltage Vo.

With particular reference to FIG. 2, the sensing, reference, and feedback capacitors are cyclically charged and discharged to provide alternate sensing and readout durations. During a first time period or phase, a first switching means 40 including switches 42, 44, 46, and 48 is actuated. The switch 42 connects the calibration voltage source 26 across the known, reference capacitor 12 for the same first time period or duration that switch 44 connects the calibration voltage source 22 across the condition sensing capacitor 10. This places a known amount of charge or electrical energy on the reference capacitor and an amount of charge on the condition sensing capacitor which varies with the sensed condition. The feedback or output voltage is concurrently applied to the feedback capacitor 14 by the switch 46 to store an amount of electrical charge which is proportional to the output voltage. The switch 48 applies the output voltage across circuit portions subject to stray capacitance, if any. The circuit portions store an amount of electrical energy or charge which is proportional to the stray capacitance and the switching transient.

During a second time period or phase, a second switching means 50, including switches 52, 54, 56, and 58 is actuated. Closing the switch 52 provides a reference or input current from the reference capacitor through a first current mirror 60. This reference current causes the current mirror to draw a like current from the condition sensing capacitor 10 through the switch 54. In the preferred embodiment, the first current mirror provides a one-to-one ratio between its reference and drawn current. This causes the same amount of electrical charge to be drawn from the sensing capacitance as was drawn from the reference capacitance. Optionally, the change on the sensing capacitance may be reduced in other proportions to the charge stored on the reference capacitor.

At the end of the second time period or phase, the same amount of charge has been drawn from the sensing capacitor as was changed on the reference capacitor. Thus, the charge remaining on the sensoring capacitor represents charges or currents. Also during the second phase, the switches 56 and 58 are closed such that a second current mirror 62 reduces the charge on the feedback capacitor 14 in proportion to the stray capacitance and the switching transients. It is to be appreciated that any of the two capacitors may store charge during the first period and that its charge may be reduced in proportion to the charge stored on either of the other two capacitors in the second time period. As yet another option, each of the other capacitances may be connected with the condition sensing capacitance to reduce the charge thereon in proportion to the sum of the charge stored on the other three capacitances.

During a third phase, a third switching means 70, including switches 72 and 74 is activated. The charge remaining on the sensing capacitor 10 is discharged through the switch 72 to a third current mirror 64. A current which is proportional to the difference between the condition sensing and reference impedances is caused to flow through its mirror side, i.e. a current of Ix-Io. Concurrently, the switch 74 drains the charge remaining on the feedback capacitor 14 to a reference size of a fourth current mirror 66. The charge remaining on the feedback capacitor is proportional to the product of the feedback voltage and the feedback capacitance. The charge flowing into the fourth current mirror causes a corresponding mirror current which is equal to the charge on the feedbeack capacitance.

The feedback current and the sensed and reference impedance difference currents are compared by a current mirror 80 which produces the difference current. The difference current is converted to a voltage across the gate and source of a switching means or transistor 82. A capacitor 84 smooths out any DC current spikes which flow thrugh the current mirror 80. The differential current Ix-Io-If from current mirror 80 is used to generate the output voltage Vout through transistor 82.

With reference to FIG. 3, the current mirrors 60, 62, 64, and 66 in the preferred embodiment are each of the same configuration. Provided that the voltage on the interconnected capacitor is greater than the threshold voltage of the current mirror transistors, a current will be induced to flow through a transistor 90. This current generates a voltage across the biasing resistor 92 which gates an input current transistor 94 conductive. An output transistor 96 is caused to conduct the same amount of current because the gate to source voltage across both transistors, 94 and 96, is the same. As the charge flows from the capacitor through the input or reference side of the current mirror, the charge on the capacitor, hence its voltage, continues to drop until the charge reaches the threshold voltage at which the transistor and current mirror become non-conductive. Because the equivalent resistance of the transistor is inversely proportional to the voltage across the drain and source less the threshold voltage, the lower the initial voltage on the capacitor, the more slowly the capacitor discharges. The clock pulse with which the switches are switched has a relatively short periodicity which limits the frequency response of the circuit. In order to discharge the capacitor relatively quickly, the bulk modulation effect of MOSFET's transistors is used to vary the threshold voltage.

The transistor 90 senses the voltage across transistor 94 and converts it to a corresponding voltage across the load resistor 92. The higher the voltage across the load resistor, the lower the threshold voltage. The voltage across the load resistor should not be higher than the turn-on voltage of the source and bulk junction. The transconductance of the transistor 90 and the resistor value of the load 92 are selected such that the initial voltage on the capacitors can be discharged to the threshold voltage in a relatively short duration.

With reference to FIG. 4, the switches of FIG. 2 are preferably CMOS analog switches. Each switch includes a complimentary pair of transistors 100, 102 which are gated between conductive and non-conductive states by the clock pulses at clock input 104. Alternately, each switch may be a single MOSFET transistor which is gated conductive by the clock pulse. Other switching devices, as are conventional in the art, may also be utilized.

Figure 5:
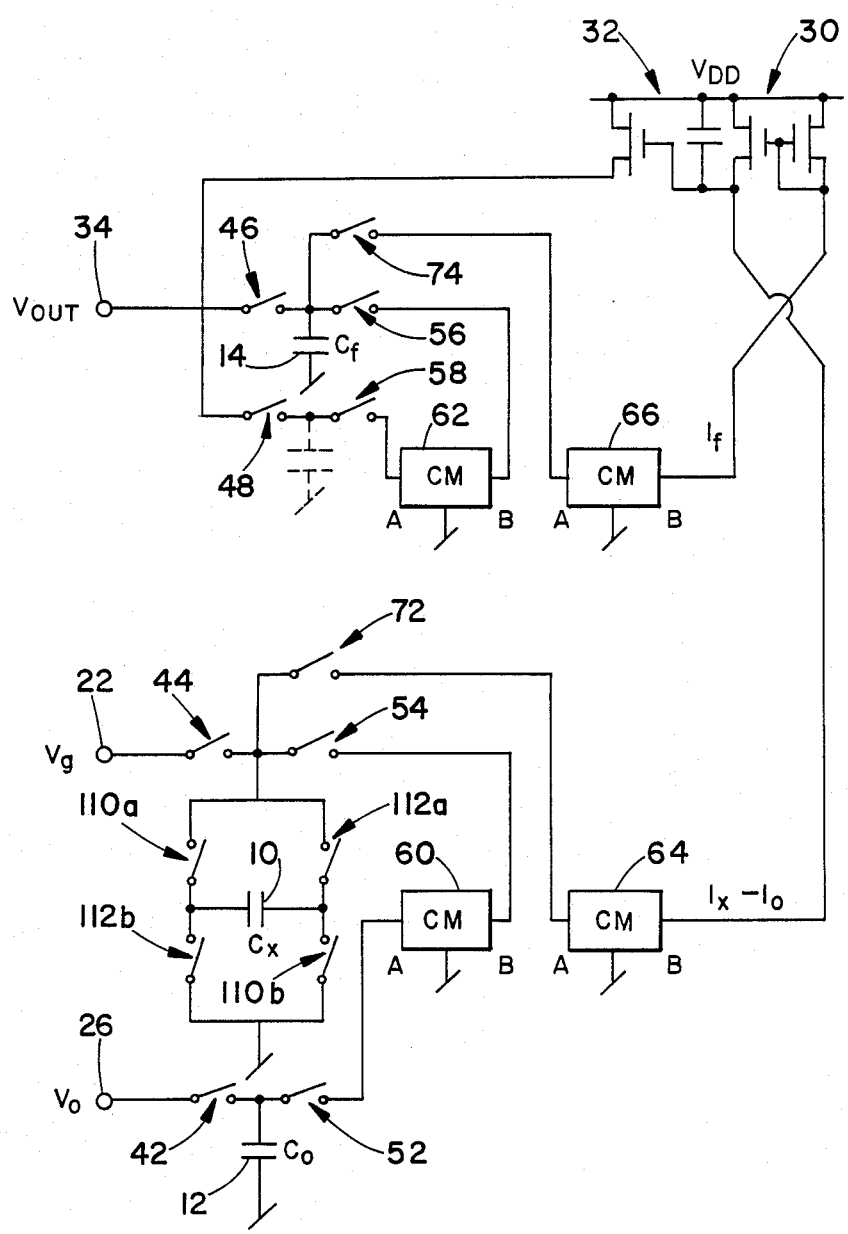
FIG. 5 is an alternate embodiment of the measuring circuit.

In the embodiment of FIG. 2, a DC bias is applied across the sensing capacitor 10. In some applications, it is not desirable to place a DC bias across the sensing capacitor. To eliminate the DC bias in the embodiment of FIG. 5, switches 110a and 110b are interconnected to be operated in unison. In a first cycle, these switches connect a first end of the sensing capacitor 10 with the first, second, and third switching means and the second end with ground. During a second measurement cycle, switches 112a and 112b are closed to connect the second end of the sensing capacitor with the first, second, and third switching means and the first end of the sensing capacitor with ground. The switches 110a, 110b, 112a, and 112b are clocked with a clocking frequency that is half the frequency of the three phase clock cycle to the first, second, and third switching means. That is, switches 110a and 110b are closed for one three phase measurement cycle and switches 112a and 112b are closed for the next three phase measurement cycle.

Figure 6:
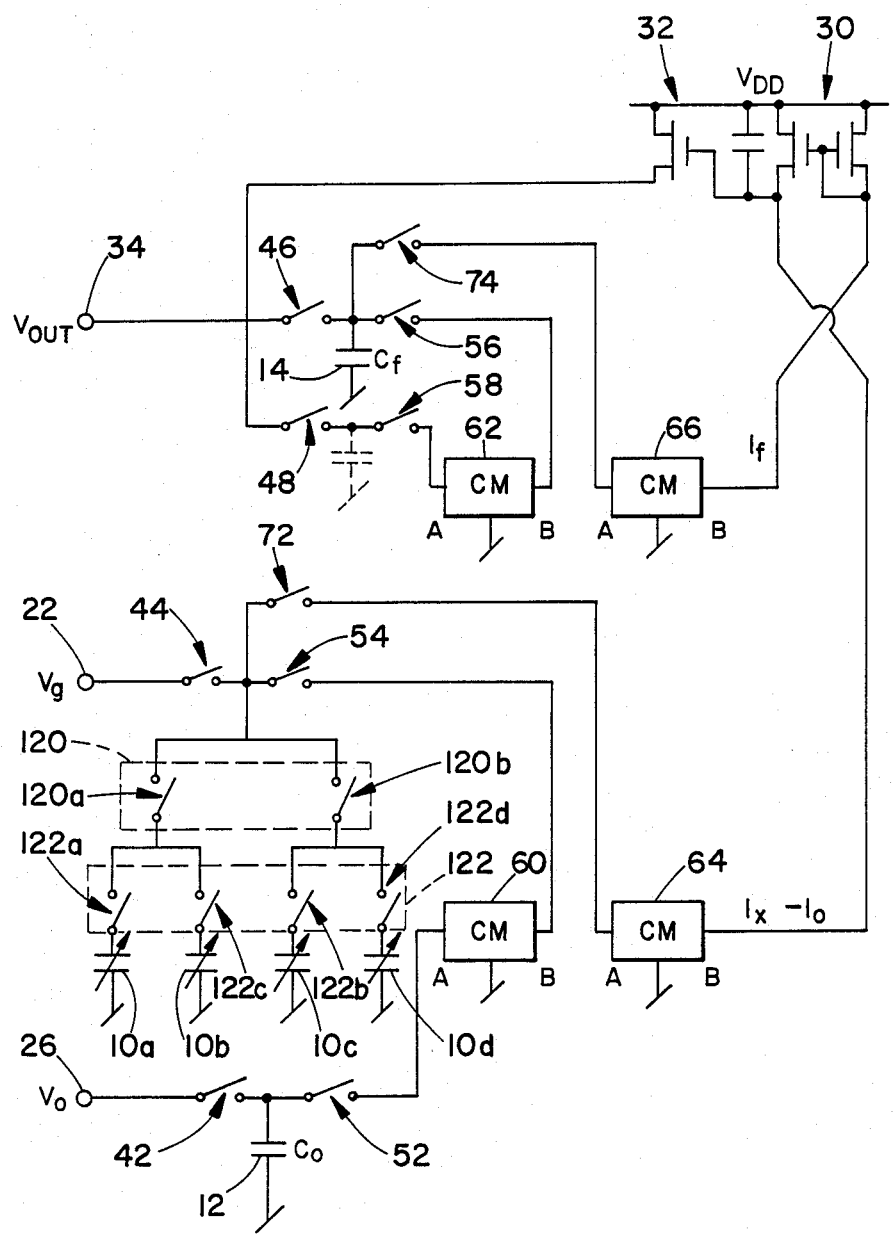
FIG. 6 illustrates yet another alternate embodiment of the measurement circuit in which a plurality of sensors are multiplexed.

With reference to FIG. 6, the present invention is also suitable for multiplexing among a plurality of sensing capacitors or other impedances. In the illustrated embodiment, only a two bit control signal is required to select among four sensing capacitors. A first, multiplex switching means 120 includes normally open switch contacts 120a and normally closed contacts 120b. A second multiplexing switch means 122 has normally open contacts 122a and 122b and normally closed contacts 122c and 122d. By selecting one of two available states for the first multiplexing switching means 120 and one of two available states for the second multiplexing switching means 122, a selected one of four sensing capacitances 10a, 10b, 10c, 10d may be interconnected with the sensing circuitry.

A high frequency carrier signal may be superimposed on either calibration signal Vg or Vo to perform a noise reduction function using a carrier modulation and lock-in techniques. The carrier modulation and lock-in techniques avoid low frequency noise inherent with MOS transistors. This enables higher resolution to be achieved.

The invention has been described with reference to the preferred embodiment. Obvious modifications and alterations will occur to others upon reading and understanding the preceding detailed description. It is intended that the invention be construed as including all such alterations and modifications insofar as they come within the scope of the appended claims or the equivalents thereof.

Having thus described a preferred embodiment, the invention is now claimed to be:

1. An impedance discrimination circuit for measuring a sensed condition related to impedance variation, the circuit comprising:
   a condition sensing impedance means whose impedance varies in accordance with the sensed condition;
   a reference impedance means having a fixed impedance which is unaffected by the sensed condition, the reference impedance means being connected in parallel with the condition sensing impedance means;
   at least one electrical energy source operatively connected with the condition sensing and reference impedances for generating a sensed condition and reference impedance difference signal which varies in accordance with a difference between the condition sensing and reference impedances;
   a feedback signal means for generating a feedback signal which varies in accordance with an output signal and a feedback impedance; and,
   a converter means for converting a difference between the feedback signal and the sensed condition and reference impedance difference signal into said output signal such that the output signal is proportional to the feedback impedance.

2. The circuit as set forth in claim 1 wherein the condition sensing, reference, and feedback impedance means include condition sensing, reference, and feedback capacitors, respectively.

3. The circuit as set forth in claim 2 wherein the at least one electrical energy source includes a first calibration voltage source for selectively applying a first calibration voltage to the condition sensing capacitor and a second calibration voltage source for applying a second calibration voltage to the reference capacitor such that a sensitivity and a null voltage of the output are independently adjustable.

4. An capacitance discrimination circuit for measuring a sensed condition related to capacitance variation, the circuit comprising:
   a condition sensing capacitor whose capacitance varies in accordance with the sensed condition;
   a reference capacitor means having a fixed impedance which is unaffected by the sensed condition;
   a first calibration voltage source for selectively applying a first calibration voltage to the condition sensing capacitor means and a second calibration voltage source for applying a second calibration voltage to the reference capacitor means;
   a feedback current source means for generating a feedback signal which varies in accordance with an output signal and a feedback capacitance means;
   a first switching means for selectively connecting the first and second calibration voltage sources with the sensing and reference capacitor means for a first duration, such that the sensed condition capacitor means stores a charge thereon which is proportional to the capacitance of the sensed condition capacitor means and the first calibration voltage and such that the reference capacitor means stores a charge thereon which is proportional to the capacitance of the reference capacitor means and the second calibration voltage; and
   a first current mirror means for during a second duration drawing a charge which is proportional to the charge on the reference capacitor means from the condition sensing capacitor means such that the charge remaining on the sensed condition capacitor means varies in accordance with the difference between the charges stored on the sensed condition and reference capacitors during the first duration;
   a means for generating a sensed condition and reference impedance difference signal that is proportional to a difference between the condition sensing and reference capacitances from the charge remaining on the sensed condition capacitor after the second duration;
   a converter means for converting a difference between the feedback signal and the sensed condition and reference impedance difference signal into said output signal.

5. The circuit as set forth in claim 4 further including a second current mirror means for converting the charge remaining on the sensed condition capacitor means after the second duration to a sensed condition and reference difference current that is proportional to the difference between the charge initially stored on the sensed condition and reference capacitor means.

6. The circuit as set forth in claim 2 wherein the feedback current source means includes a switching means for selectively interconnecting the feedback capacitor means with the output signal and a third current mirror means for converting charges stored on the feedback capacitor means to the feedback signal which is a current that varies in proportion to the output signal.

7. The circuit as set forth in claim 6 further including a stray capacitance and switching transients correcting means for adjusting for stray capacitance.

8. The circuit as set forth in claim 7 wherein the stray capacitance means includes a fourth current mirror which selectively reduces the charge stored on the feedback capacitor means in proportion to stray capacitance before the third current mirror means produces the feedback current.

9. The circuit as set forth in claim 6 wherein the further including a transistor which is gated in accordance with the difference between the sensed condition and reference difference current and the feedback signal to generate the output signal which is a voltage that is proportional thereto.

10. The circuit as set forth in claim 5 further including a DC bias eliminating means for selectively reversing the polarity with which the sensed condition capacitor means is switched into electrical communication with the first calibration voltage source and with the first current mirror means.

11. The circuit as set forth in claim 5 further including a plurality of condition sensing capacitors and a multiplexing means for selectively interconnecting a selected one of the plurality of condition sensing capacitors with the first calibration voltage source and the first current mirror means.

12. A circuit for measuring a sensed condition related to variations in capacitance, the circuit comprising:
   at least one condition sensing capacitance means whose capacitance varies in accordance with the sensed condition;
   a reference capacitance means whose capacitance is unaffected by the sensed condition;
   a feedback capacitance means;
   a first calibration voltage source for generating a first calibration voltage;
   a second calibration voltage source for generating a second calibration voltage;
   first, second, and third current mirror means, each current mirror means causing an output current which varies in a fixed proportion to an input current;
   an output;
   a first switching means for during a first time period connecting the condition sensing capacitance means with the first calibration voltage source, connecting the reference capacitance means with the second calibration voltage source, and connecting the feedback capacitance means with the output;
   a second switching means for during a second time period connecting one of the reference and feedback capacitance means with the input of the first current mirror, connecting the condition sensing capacitance means with the output of the first current mirror;
   a third switching means for during a third time period connecting the sensed condition capacitor with the second current mirror and connecting the other of feedback and reference capacitance means with the third current mirror;
   a combining means for subtractively combining output currents from the second and third current mirrors; and,
   an output means operatively connected with the combining means for producing an output signal which varies in accordance with the subtractively combined outputs of the second and third current mirrors, the output means being operatively connected with the output.

13. The circuit as set forth in claim 12 further including a stray capacitance correcting means including:
the first switching means further selectively connects the output with portions of the circuit which are affected by stray capacitance;
the second switching means further connects said circuit portion with an input of a fourth current mirror and concurrently connects the other of the feedback and reference capacitance means with the output of the fourth current mirror during the second time period such that charge stored on the other of the feedback and reference capacitance means is reduced to correct for stray capacitance.

14. A method of measuring a sensed condition related to impedance variation, the method comprising:
(a) positioning a condition sensing impedance in a location where its impedance changes in accordance with the sensed condition;
(b) during a first time period, connecting the condition sensing impedance with an electrical energy source such that an amount of charge which is proportional to the impedance is stored therein, connecting a reference impedance with an electrical energy source such that a known amount of electrical energy is stored therein;
(c) during a second time period, removing an amount of electrical energy from the condition sensing impedance which is proportional to the energy stored in the reference impedance;
(d) during a third time period, converting the charge remaining on the condition sensing impedance into a current which varies in proportion to the charge remaining on the condition sensing impedance and converting the electrical energy stored in the feedback impedance to a current which is proportional thereto;
(e) subtractively combining the current from the feedback impedance with the current from the condition sensing impedance to create a difference current.

15. The method as set forth in claim 14 further including (h) converting the difference current to a voltage which varies in accordance therewith and applying said voltage to the output.

16. The method as set forth in claim 15 wherein the condition sensing, reference, and feedback impedances are capacitances.

17. The method as set forth in claim 16 further including:
(i) during the first time period, connecting a circuit portion with the output to store electrical energy in any stray capacitance;
(j) during the second time period, decreasing the energy stored on the feedback capacitance by an amount which is proportional to the charge stored in the stray capacitance.

18. The method as set forth in claim 17 further including repeating steps (a) through (j) a plurality of times, in alternate repetitions reversing the polarity of the condition sensing capacitance.

19. An impedance discrimination circuit for measuring a sensed condition related to impedance variation, the circuit comprising:
a condition sensing impedance means whose impedance varies in accordance with the sensed condition;
a reference impedance means having a fixed impedance which is unaffected by the sensed condition;
a calibration electrical energy source for selectively applying calibration signal to the condition sensing impedance means and the reference impedance means;
a feedback signal means for generating a feedback signal which varies in accordance with an output signal and a feedback impedance;
a first switching means for selectively connecting the calibration electrical energy source with the sensing and reference impedance means for a first duration, such that the sensed condition impedance means stores electrical energy which is proportional to the impedance of the sensed condition impedance means and such that the reference impedance means stores electrical energy which is proportional to the impedance of the reference impedance means; and,
a means for during a second duration drawing electrical energy which is proportional to the electrical energy stored by the reference impedance from the condition sensing impedance means such that the electrical energy stored to the condition sensing impedance means varies in accordance with the difference between the impedances of the condition sensing and reference impedance means; and,
a means for producing the output signal from the energy stored in the condition sensing impedance and the feedback signal.

* * * * *